United States Patent
van Manen et al.

[11] Patent Number: 5,897,822
[45] Date of Patent: Apr. 27, 1999

[54] METHOD OF MANUFACTURING HOLLOW PLASTIC ARTICLES

[75] Inventors: Dirk van Manen; Hendrikus Johana Theodorus Albers, both of Dalen, Netherlands

[73] Assignee: Inter Tooling Services B.V., Emmen, Netherlands

[21] Appl. No.: 08/732,849

[22] Filed: Oct. 15, 1996

[30] Foreign Application Priority Data

Oct. 13, 1995 [NL] Netherlands ............................ 1001417

[51] Int. Cl.⁶ .................................................. B29C 45/16
[52] U.S. Cl. ........................ 264/255; 264/328.8; 264/510; 264/537; 264/DIG. 57
[58] Field of Search ................................... 264/250, 255, 264/328.8, 510, 513, 537, 328.12, DIG. 57; 425/130, 523

[56] References Cited

U.S. PATENT DOCUMENTS

| | | | |
|---|---|---|---|
| 4,143,733 | 3/1979 | Von Buren et al. | 425/130 |
| 4,459,257 | 7/1984 | Baciu | 264/255 |
| 4,701,292 | 10/1987 | Valyi | 264/255 |
| 4,710,118 | 12/1987 | Krishnakumar | 425/130 |
| 4,923,723 | 5/1990 | Collette et al. | 428/35.7 |
| 4,950,143 | 8/1990 | Krishnakumar | 425/130 |
| 4,990,301 | 2/1991 | Krishnakumar | 264/513 |
| 5,032,341 | 7/1991 | Krishnakumar | 264/255 |
| 5,049,345 | 9/1991 | Collette et al. | 264/255 |
| 5,098,274 | 3/1992 | Krishnakumar | 425/133.1 |
| 5,141,695 | 8/1992 | Nakamura | 264/255 |
| 5,200,207 | 4/1993 | Akselrud et al. | 425/557 |
| 5,645,786 | 7/1997 | Okada et al. | 264/255 |

FOREIGN PATENT DOCUMENTS

| | | |
|---|---|---|
| 0043543 | 1/1982 | European Pat. Off. . |
| 0153120 | 8/1985 | European Pat. Off. . |
| 0 339 753 A1 | 11/1989 | European Pat. Off. . |
| 0359131 | 3/1990 | European Pat. Off. . |
| 0367123 | 5/1990 | European Pat. Off. . |
| 0376469 | 7/1990 | European Pat. Off. . |
| 0377497 | 7/1990 | European Pat. Off. . |
| 0380215 | 8/1990 | European Pat. Off. . |
| 0480223 | 4/1992 | European Pat. Off. . |
| 0371487 | 9/1994 | European Pat. Off. . |
| 0157475 | 10/1994 | European Pat. Off. . |
| 0647514 | 4/1995 | European Pat. Off. . |
| 07171859 | 7/1995 | European Pat. Off. . |
| 2 329 147 | 4/1973 | France . |
| 2 259 818 | 7/1974 | Germany . |
| 3519921 | 12/1985 | Germany . |
| 7201123 | 8/1972 | Netherlands . |

OTHER PUBLICATIONS

Patent Abstracts of Japan, vol. 14, No. 247, May 25, 1990 & JP-A 2-067117 (Toyo Seikan Kaisha Ltd), Mar. 7, 1990.

*Primary Examiner*—Angela Ortiz
*Attorney, Agent, or Firm*—Jacobson, Price, Holman & Stern, PLLC

[57] ABSTRACT

A method and apparatus for manufacturing hollow plastic articles having a wall which at least partly consists of at least one core layer and two outer layers covering the core layer on both sides, in particular suitable for manufacturing preforms for bottles, wherein use is made of an injection-molding machine with a mold comprising at least one mold cavity, and an injection nozzle which, via an injection channel in the mold, connects to the mold cavity and has a central material feed channel, a needle of a controllable needle valve, which needle is active in the central material feed channel and can close or release the part of the central material feed channel located adjacent the injection channel, and at least one further material feed channel, opening into the central material feed channel, wherein first a plastic material of a first type for forming the outer layers is fed to the mold cavity and then at least one plastic material of a second type for forming at least one core layer. After the feed of the material of a second type and after the freezing of the material in the injection channel, material of the first type is fed to the central channel in at least the space before the free end of the needle, and then, the needle is moved to the injection channel for mechanically compressing, in the sprue of the plastic article located in the injection channel, the material located before the needle.

12 Claims, 17 Drawing Sheets

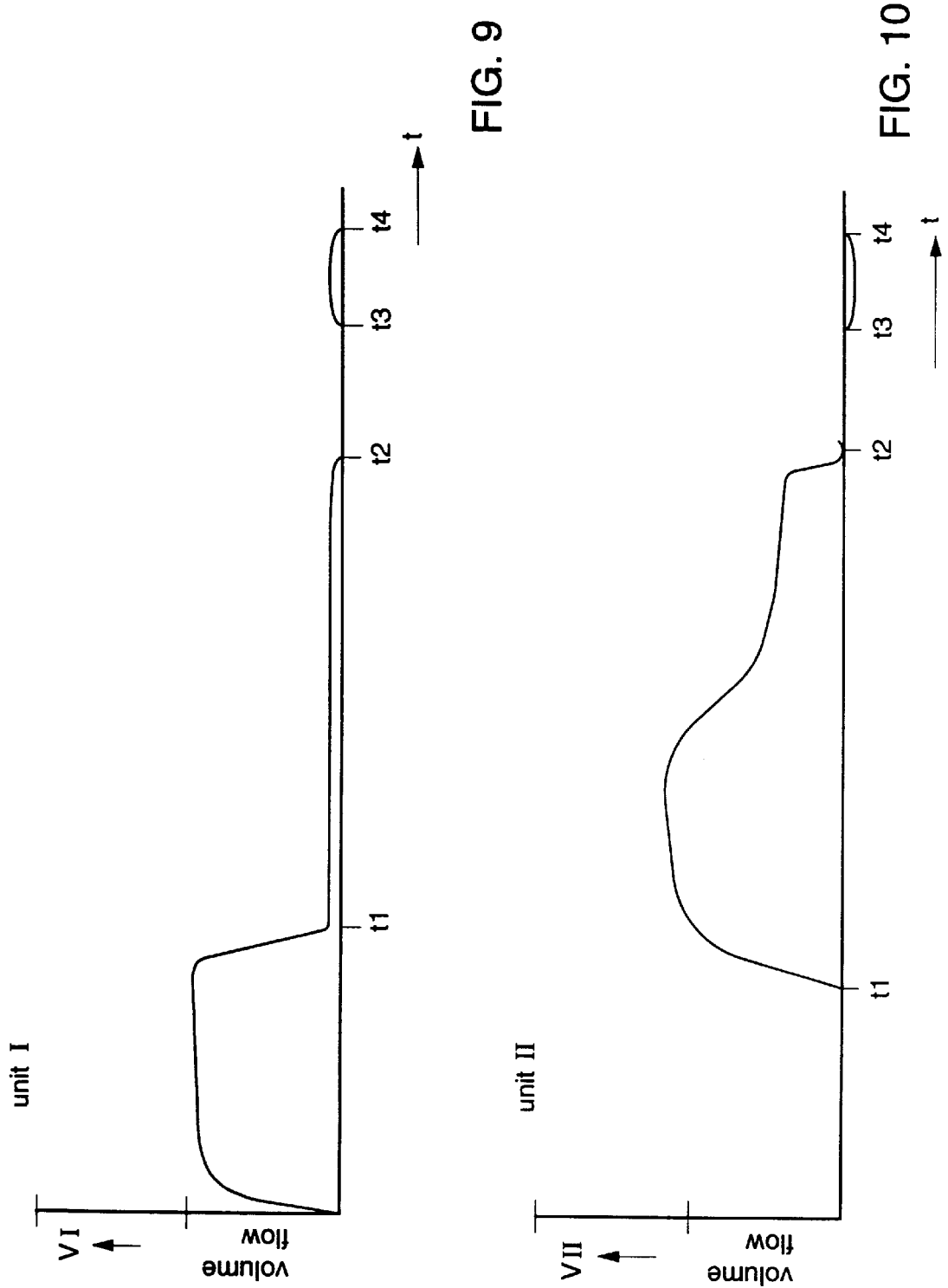

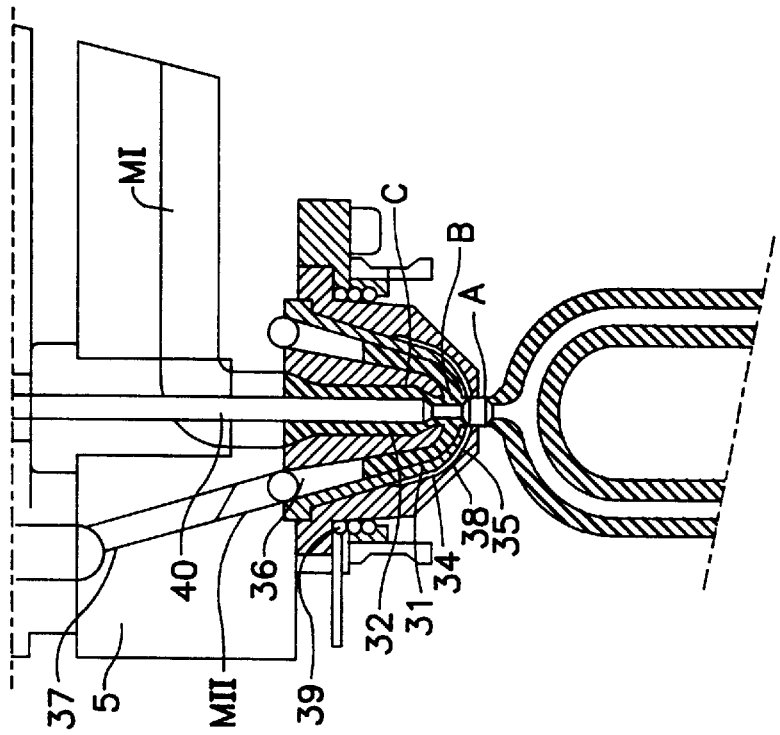
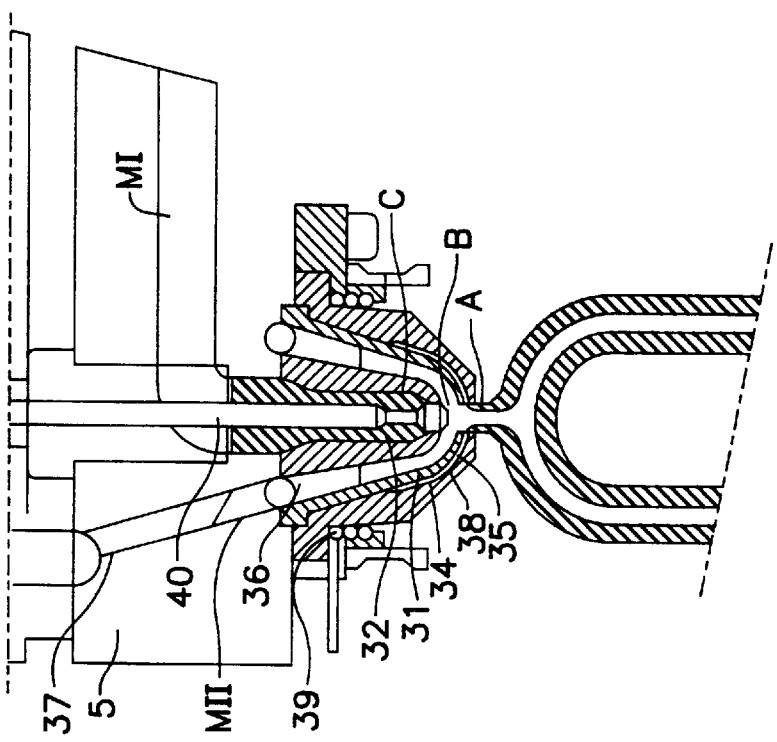

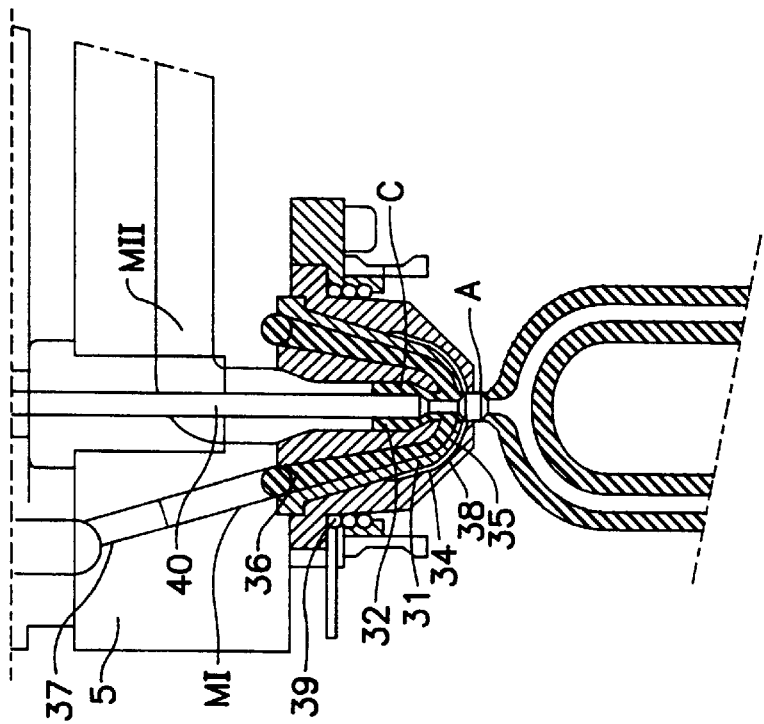
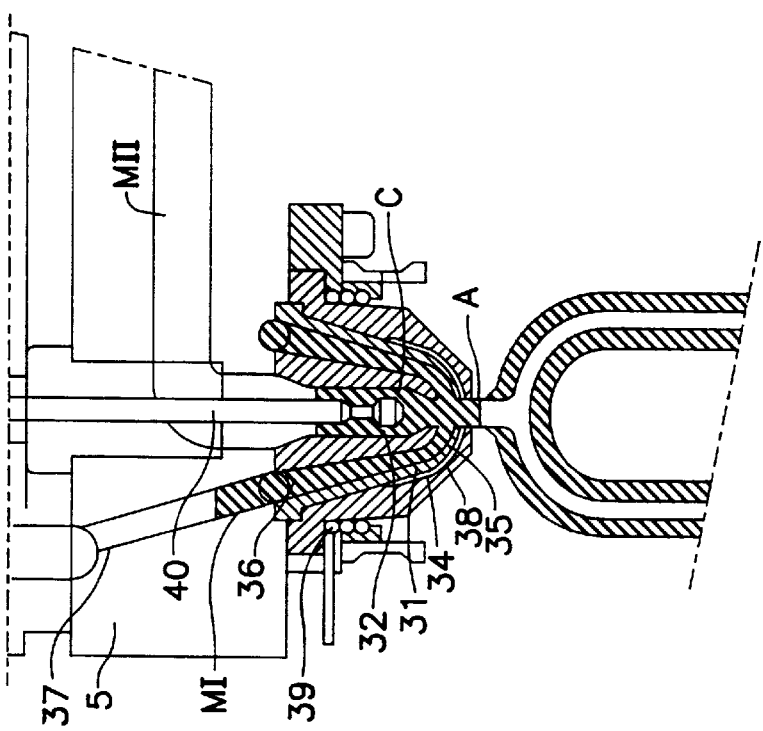

METHOD OF MANUFACTURING HOLLOW PLASTIC ARTICLES

FIELD OF THE INVENTION

The invention relates to a method and apparatus for manufacturing hollow plastic articles having a wall which is at least partly built up of two or more layers. The invention is in particular suitable for the production of preforms for bottles according to an injection-molding method.

BACKGROUND OF THE INVENTION

In the last few years, the use of plastic containers instead of glass containers has taken place on an increasingly large scale. As a consequence, the number of used plastic containers, such as bottles, also increases substantially. Although in principle, the used plastic bottles are indeed suitable, like glass bottles, for being refilled a number of times, the number of plastic bottles that are no longer suitable for being filled and used again, and that should hence be considered waste material, increases as well. Usually, however, the material which the plastic bottles consist of is in fact suitable for being reused for manufacturing plastic bottles.

However, this involves the problem that it is often required that the reused material in the final product manufactured by means thereof, do not come into contact with the contents of the containers.

Sometimes, it is also desired for other reasons to provide a core layer of a different material in the wall, or a part thereof, of a plastic container. Such a core layer can for instance serve as a barrier layer to render the wall of the container to be formed impermeable to specific substances. For instance, the core layer can have special water-impermeable or oxygen-impermeable properties to prevent diffusion of water or oxygen through the container wall. Depending on the properties desired, such a core layer can consist of virgin or reused material.

A problem that may be involved in the use of a core layer is that the bond between the core layer and the material layers enveloping the core layer on the inside and the outside of the casing proves to be insufficient. In that case, the layers may come loose from each other, which may manifest itself when the preforms are inflated into bottles or when the preforms cool down, or during the use of the bottles, as a consequence of which the container may become useless.

SUMMARY OF THE INVENTION

Hence, there is a need for an improved manufacturing method for plastic containers, of which the wall at least partly contains a core layer of a type of material different from that of the outer layer. In this connection, a different type of material is also understood to mean the same material as that of the outer layer, yet in reused form. It is the object of the invention to satisfy the above-outlined need. To this end, in accordance with the invention, a method for manufacturing hollow plastic articles having a wall which at least partly consists of at least one core layer and two outer layers covering the core layer on both sides, in particular suitable for manufacturing preforms for bottles, wherein use is made of an injection-molding machine with a mold comprising at least one mold cavity, and an injection nozzle which, via an injection channel in the mold, connects to the mold cavity and has a central material feed channel, a needle of a controllable needle valve, which needle is active in the central material feed channel and can close or release the part of the central material feed channel located adjacent the injection channel, and at least one further material feed channel, opening into the central material feed channel, wherein first a plastic material of a first type for forming the outer layers is fed to the mold cavity and then at least one plastic material of a second type for forming at least one core layer, is characterized in that after the feed of the material of a second type to the mold cavity, material of the first type is fed to the central channel in at least the space before the free end of the needle, and that after the material in the injection channel is at least partly frozen, the needle is moved to the injection channel for mechanically compressing, in the sprue of the plastic article located in the injection channel, the material located before the needle.

In accordance with the invention, an apparatus for manufacturing hollow plastic articles having a wall which at least partly consists of at least one core layer and two outer layers covering the core layer on both sides, in particular suitable for manufacturing preforms of bottles, wherein use is made of an injection-molding machine with a mold comprising at least one mold cavity, and a injection nozzle which, via an injection channel in the mold, connects to the mold cavity and has a central material feed channel, a needle of a controllable needle valve, which needle is active in the central material feed channel and can close or release the part of the central material feed channel located adjacent the injection channel, and at least one further material feed channel, opening into the central material feed channel, wherein means are provided for first feeding to the mold cavity a plastic material of a first type for forming the outer layers, and then feeding to the mold cavity at least one plastic material of a second type for forming at least one core layer, is characterized in that the controllable needle valve is adapted to mechanically compress, at the end of an injection-molding cycle, material located before and in the injection channel after the sprue of the hollow article, which sprue is located in the injection channel, is at least partly "frozen".

It is observed that EP-A-0 367 123 discloses a preform whose wall partly comprises three layers, i.e. an inner and an outer layer of a first type of material and a core layer of a second type of material. The different materials are injected into the mold cavity by means of an injection nozzle having a central channel and two concentric channels provided around the central channel. Provided in the central channel is a needle valve whereby the central part can selectively be closed separately or in combination with one or two concentric channels. According to the technique described in EP-A-0 367 123, the bottom portion of the preforms to be manufactured is provided with a second core layer of a third type of material within the first core layer. Hence, the sprue comprises three concentric layers of material, whose end faces are exposed. Even if the third type of material entirely displaces or erodes the second type of material due to the fact that it is injected at a considerably higher temperature, the end faces of the outer and inner layers and the second core layer respectively remain exposed, so that it remains possible that the layers come loose.

Further, EP-A-0 380 215 discloses an apparatus having an injection nozzle comprising a needle valve for manufacturing multilayered preforms. In the method described in this document, too, the end faces of the different layers are exposed in the sprue.

In addition, EP-B-0 153 120 discloses a preform whose wall consists of five layers, whose end faces, however, also lie clear in the sprue again. Similar observations hold for the preforms described in EP-B-0 376 469, DE-A-35 19 921 and EP-B-0 371 487.

BRIEF DESCRIPTION OF THE DRAWINGS

Hereinafter, the invention will be further described with reference to the accompanying drawing of an exemplary embodiment.

FIGS. 9 and 10 show the volume flows of materials used in the method of FIGS. 4–8;

FIGS. 17–22 schematically illustrate another exemplary embodiment of a method according to the invention;

FIGS. 23–28 schematically illustrate yet another exemplary embodiment of a method according to the invention.

DETAILED DESCRIPTION OF THE PREFERRED EMBODIMENTS

Figure 1:
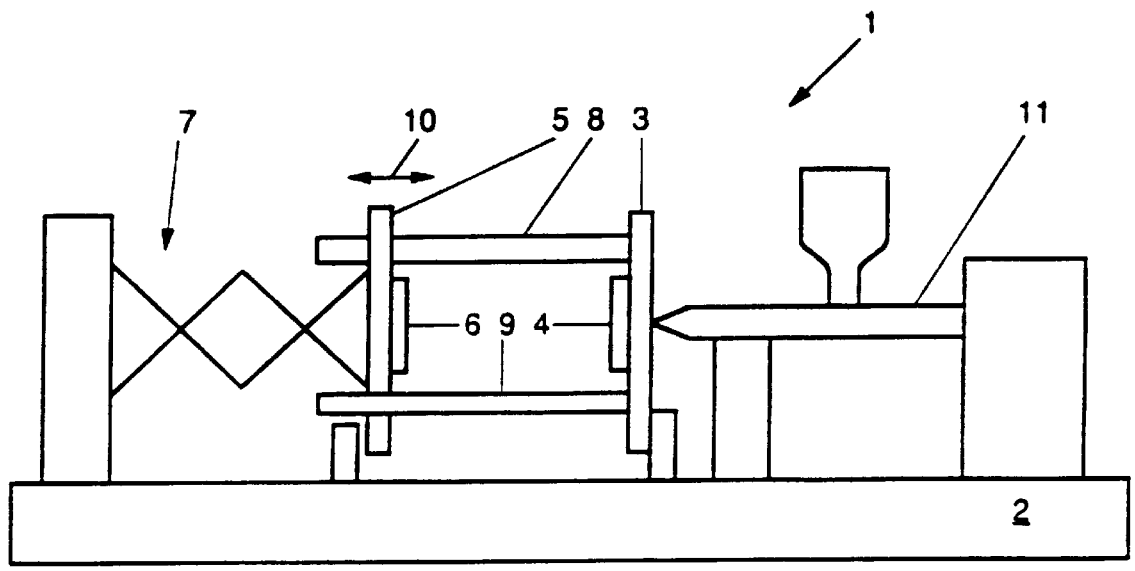
FIG. 1 schematically shows, in perspective, an example of an injection-molding apparatus for producing preforms.

FIG. 1 schematically shows, in side elevation, an example of an injection-molding apparatus 1, comprising a frame 2 having a stationary machine plate 3, provided with a mold part 4, and a movable machine plate 5, provided with a mold part 6. The machine plate 5 is connected to a drive mechanism 7, depicted in outline only, by means of which the machine plate 5 can be moved along the guide rods 8, 9 from and to the opposite machine plate 3, as indicated by an arrow 10. The apparatus further comprises a feeding device 11 for liquid plastic, such as for instance an extruder.

Normally, the mold parts 4 and 5 each comprise a number of cavities or cores, usually arranged in rows and columns, so that during a single injection-molding cycle a large number of products, such as preforms for containers, can be manufactured. Via a system of channels, the liquid plastic is fed to the injection-molding cavities formed by the two mold parts in the closed position of the apparatus. When the mold is opened, the newly formed preforms usually stay behind in one of the mold parts and the preforms are removed from the mold in one of the manners known for that purpose, for instance by means of a robot arm.

As observed hereinabove, there is a need for a possibility of processing priorly used material in new products, or of using an intermediate layer of a different type of material. For containers such as bottles, this means that there is a need for a possibility of manufacturing products with two outer layers from new material, wherein, between the two layers, reused material or (virgin) material of another type is processed.

Figure 3:
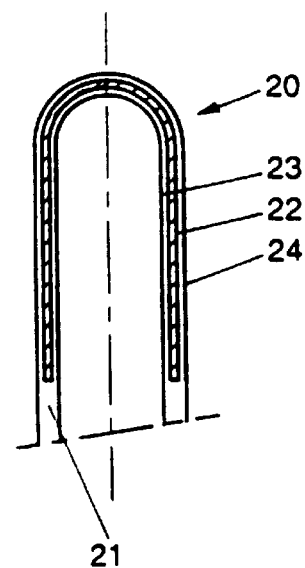
FIG. 3 schematically shows, in cross section, a part of a preform for a plastic bottle, manufactured in an apparatus according to the invention.

FIG. 3 schematically shows, in section, a part 20 of a preform for a plastic bottle, having a wall 21 comprising an outer layer 22 of new material, an inner layer 23 of new material, and an intermediate layer 24 of reused material or material of another type.

Figure 2:
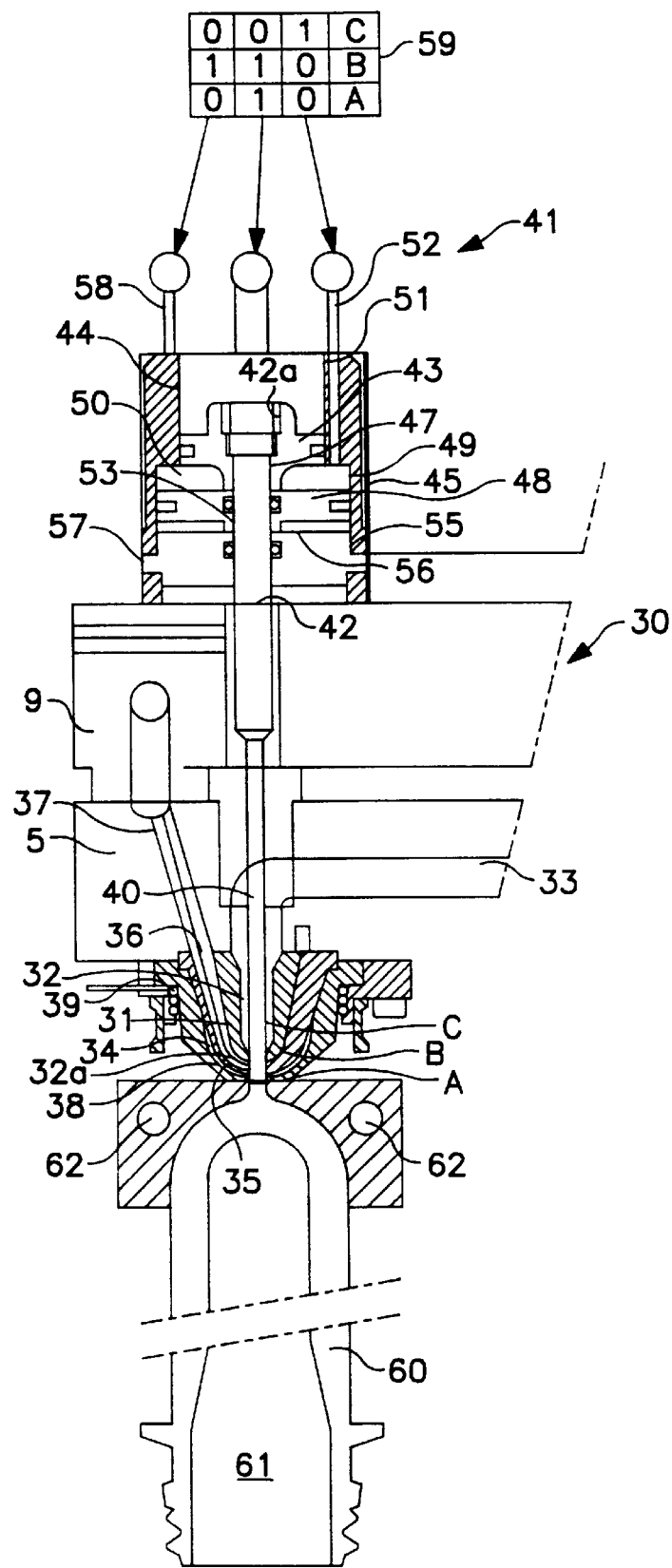
FIG. 2 schematically shows, in section, an example of a plastic-injection apparatus according to the invention for use in an injection-molding apparatus for producing preforms.

An example of an apparatus for feeding liquid plastic to a mold of an injection-molding apparatus so that a layered product as shown in FIG. 3 can be manufactured, is shown schematically in FIG. 2. Such an apparatus is also indicated by the term "hot runner".

The feeding device 30 comprises a first injection nozzle 31 having a central channel 32 connected to a feed channel 33 for a first type of plastic, for instance new material, also termed virgin material. The central channel 32 of the injection nozzle 31 connects to a central bore 32a in the injection nozzle 31. The central bore has a smaller diameter than the central channel.

Arranged over the first injection nozzle 31 is a second injection nozzle 34, provided with a bore 35 in line with the central channel 32a, and at least one side channel 36 which extends obliquely through the injection nozzle and is connected to a feed channel 37 for a second type of plastic, for instance material already used before. The bore 35 has the same diameter as the bore 32a. The side channel can be an oblique bore or can have a slightly bent configuration, as shown in FIG. 2.

Provided around the assembly of injection nozzles 31 and 34 is an outer sleeve 38 comprising a heating element 39 for temperature regulation. The central channel 32 also continues through the sleeve 38. Arranged in the central channel 32 is a needle 40 of a suitable needle valve, which, by means of a suitable control device 41, can be brought into different positions, indicated by A, B and C in FIG. 2. The needle has a diameter which is substantially equal to that of the bore 35 in the second injection nozzle and also to that of the end section of the central channel in the first injection nozzle. Hence, the needle can close off the injection nozzles. Except for the end section formed by the bore 32a, the central channel 32 in the first injection nozzle has a larger diameter than the needle, enabling liquid plastic to flow through this channel if the needle leaves the end section clear but does reach into the remaining part of the central channel.

In the position indicated by C, the needle leaves the end section of the central channel 32 free, as well as the bore 35 in the second injection nozzle. Accordingly, in this position, liquid plastic could be fed to the mold both via feed channel 33 and via feed channel 37.

In position B, the end section of the central channel 32 of the first injection nozzle is closed, but the bore 35 in the second injection nozzle is open. Accordingly, in this position, plastic can be fed via channel 36 only.

Finally, in position A, both injection nozzles are closed.

The positions of the needle valve are controlled by a control device 41, which, in the example shown, comprises a multi-stage piston system operated by a pressure medium. The multi-stage piston system can for instance be operated pneumatically.

In the example shown, the head 42a of the shank 42 of the needle valve 40 is mounted in a first piston 43, located in a narrowed portion 44 of the cylinder 45. Above the piston, the narrowed portion 44 of the cylinder communicates with a pressure line 46. At its lower end, the piston 43 has a shoulder 47, in this example located directly around the needle valve. In the position shown, the shoulder 47 rests against a second piston 48, located in a wider portion 49 of the cylinder. The shoulder 47 has as a result that between the pistons 43 and 48, there is always a chamber 50 having minimum dimensions determined by the shoulder. Via a bore 51 in the cylinder wall, the chamber 50 is connected to a second pressure line 52. The second or lower piston 48 has its lower end again provided with a shoulder 53, which, in the situation shown, rests against a cylinder bottom 54 located in a still wider portion 55 of the cylinder. The shoulder is again a central shoulder, realizing again a minimum free chamber 56 between the central piston and the bottom 54. Via a channel 57 in the cylinder wall, the chamber 56 communicates with a third pressure line 58.

The shank 42 of the needle valve can sealingly slide through bores in the lower piston and the cylinder bottom, which bores comprise sealing means.

The position of the needle valve can now be controlled by feeding, in a suitable manner, pressure medium to the cylinder via pressure lines 46, 52 and 58.

In table 59 it is indicated which pressure lines should be energized in order to bring the needle valve into the positions A, B and C. For energizing the pressure lines, suitable energizing means can be provided, which can for instance comprise controllable valves or the like. The valves or the like can advantageously be controlled in a pre-programmed manner, for instance by a microprocessor. Position A (complete closure of the injection nozzles) is realized through energization (indicated by "1") of pressure line 46, while the other pressure lines are relieved (indicated by "0"). The Figure shows the needle in position A and also shows the associated piston positions.

If, starting from position A, the pressure on line 46 is maintained and the line 58 is also energized, an increased pressure is created in the chamber 56. Because the piston 48 has a larger diameter than the first piston 43, the force exerted by the second piston 48 on the first piston 43 via the shoulder 47 is greater than the force exerted on the first piston via the pressure line 46. Hence, the pistons 48 and 43 will move upwards until the piston 48 reaches the narrowed top portion 44 of the cylinder. The needle is then in position B. If, next, via pressure line 52, the chamber 50 below the upper piston is energized and at least the pressure line 46 communicating with the space above the upper piston is relieved, then the upper piston 43 will move further upwards, causing the needle valve to take up the position C.

Hence, the needle can be brought into any of the positions indicated by properly effecting an increased pressure in one or more of the spaces in the cylinder above the upper piston and/or between the pistons and/or below the lower piston. In the example described, it is assumed that the energization pressure of all pressure lines always has the same value, and the force acting on the pistons differs because the pistons have different diameters. In principle, it is also possible to work with different pressure values, for instance through the use of reducing valves, optionally in combination with pistons of different diameters, to realize a comparable control.

Further, FIG. 2 schematically shows a mold cavity 60 for a preform for a bottle, which mold cavity connects to the bore 35. The mold cavity is located between one mold part, provided with one or more cavities, and the other mold part, carrying one or more cores 61. Further, cooling channels 62 are provided around the mold cavity and, commonly, also in the cores 61, through which cooling channels, in operation, cooling liquid flows.

In a practical injection-molding cycle, the apparatus 41 can be controlled in different manners. Depending on the injection-molding method to be used, two or three positions of the needle valve can be used therefor.

FIGS. 4–10 illustrate an injection-molding method for preforms of bottles, wherein two different positions of the needle valve are used. FIGS. 4–8 schematically illustrate a number of phases a through e of an injection-molding cycle, wherein the needle assumes two different positions corresponding to the positions C and A of FIG. 2. FIGS. 9 and 10 show the associated curve of the volume flows VI and VII respectively in the channels for the first and the second type of material. FIGS. 4–9 schematically show, in section, a similar injection nozzle 60 as shown in FIG. 2, provided with a central bore 32a, 35, and one or more oblique bores 36 opening into the central bore. In the Figure, two oblique bores 37 are indicated. The central bore connects to a short injection channel 63 of a mold cavity 60. Located in the central bore is the needle 40 and from the injection channel to beyond the oblique bore 36, the central bore has a relatively small diameter, in a similar manner as indicated in FIG. 2. This diameter corresponds to that of the needle, at least the end thereof.

Figure 4:
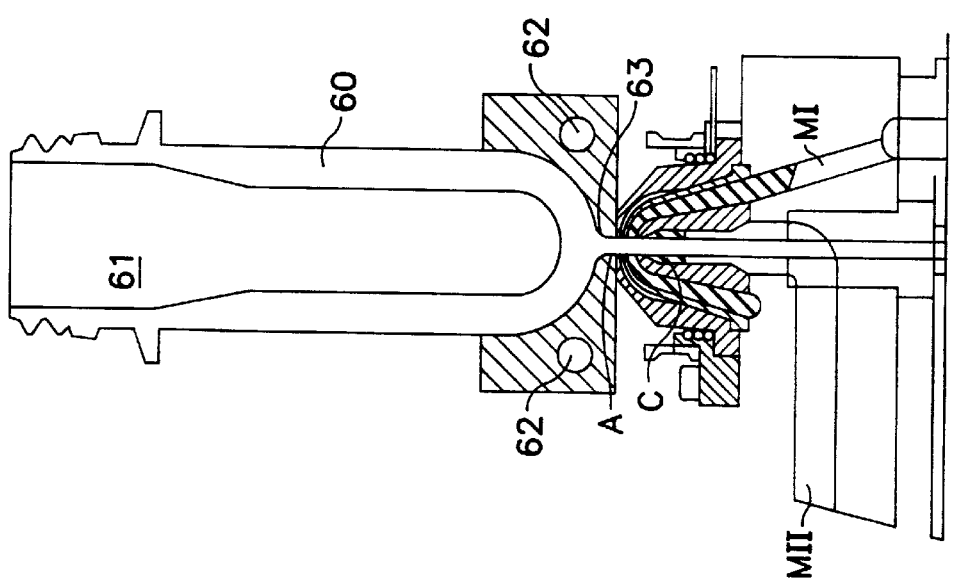

FIG. 4 shows the needle 40 in the position wherein the bore 32a, 35 is completely closed. Both the bore 32a, 35 and the bores 36 are then completely closed. The mold is closed and the mold cavity 60 is empty. This is the initial state of an injection molding cycle.

Figure 5:
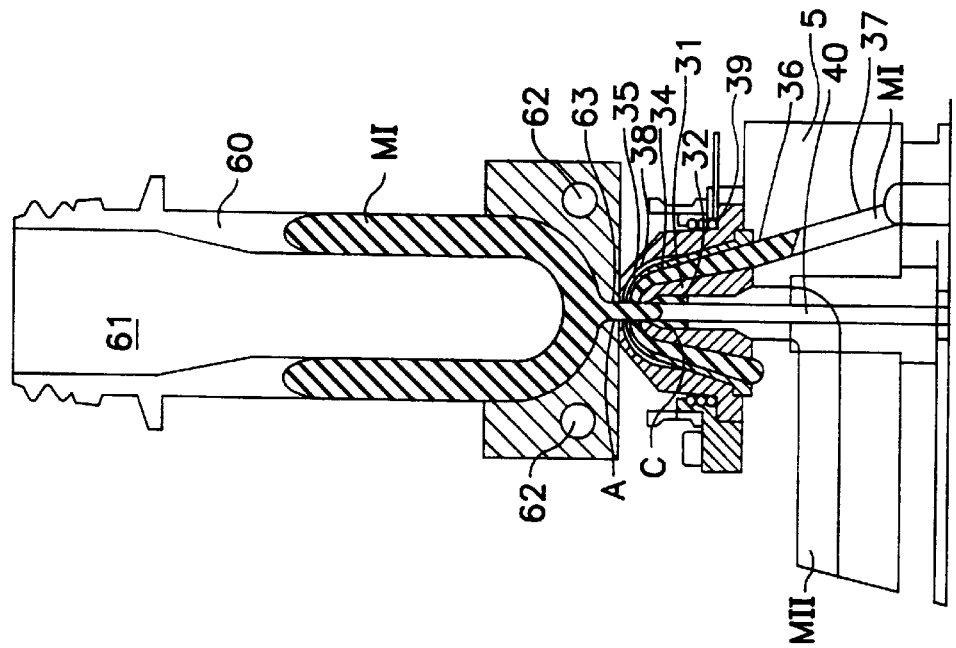
FIGS. 4–8 schematically illustrate an exemplary embodiment of a method according to the invention.

In the situation shown in FIG. 5, the needle is withdrawn so far that the channels 32a, 35 and 36 are open. In that situation, the actual injection molding operation can start and, as shown in FIG. 9, an injection pressure is built up, through means suitable for that purpose, for the first type of material MI, in this example located in the oblique bore(s). In FIG. 9, the resulting volume flow VI of the material MI is plotted out against the time t. Via the injection channel 63, the first type of material MI flows from the oblique bore(s) into the injection-molding cavity. The second type of material MII cannot reach the central bore, because the pressure in the central bore is lower than in the oblique bores, as can be seen in FIG. 10.

When sufficient material of the first type has been injected into the mold cavity (point of time t1 in FIG. 9), the injection pressure is reduced to a predetermined value, with the volume flow decreasing to a low value of, for instance, 5% of the total volume flow. At that moment, the mold cavity can for instance be filled for ca. 70% with material MI, as is shown schematically in FIG. 5. Also, through means suitable for that purpose, an injection pressure is built up in the bore 32 for the second type of material MII. The pressures are chosen so that the larger part of the flow of material fed to the mold cavity in this phase consists of material of the second type. The ratio can for instance be ca. 5–10% of material of the first type and ca. 90–95% of material of the second type. In the Figure, the flow of the material MII of the second type is indicated at 66. The combined volume flow VI+VII, occurring after the point of time t1, displaces in a usual manner the material MI already present in the mold cavity, so that within the material MI a core of material MI+MII is created. However, as the material MI is fed via the side channels 36, this material is located only in two narrow strips on the outside of the material MII, i.e. against the first material MI, as shown in FIG. 6.

Figure 7:
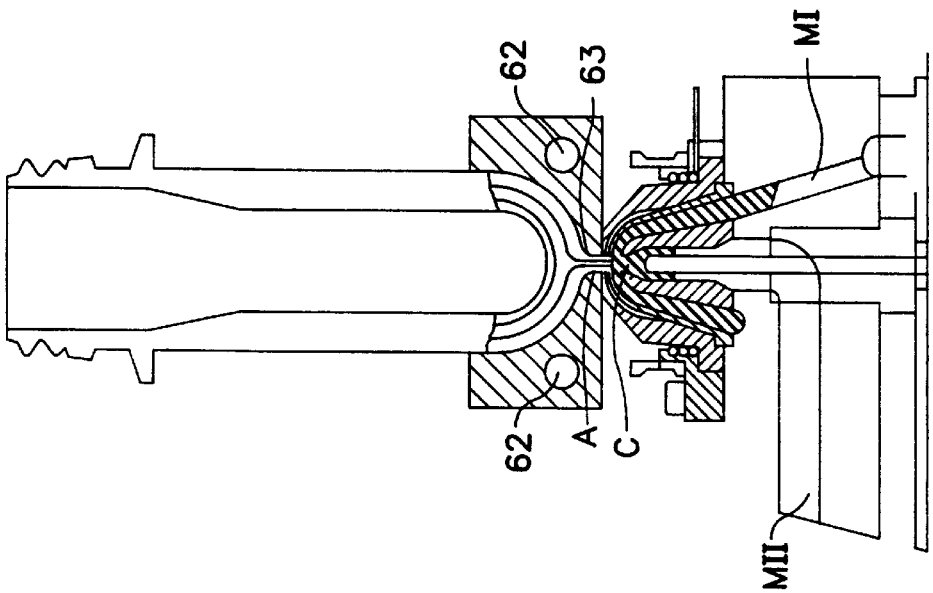
Figure 6:
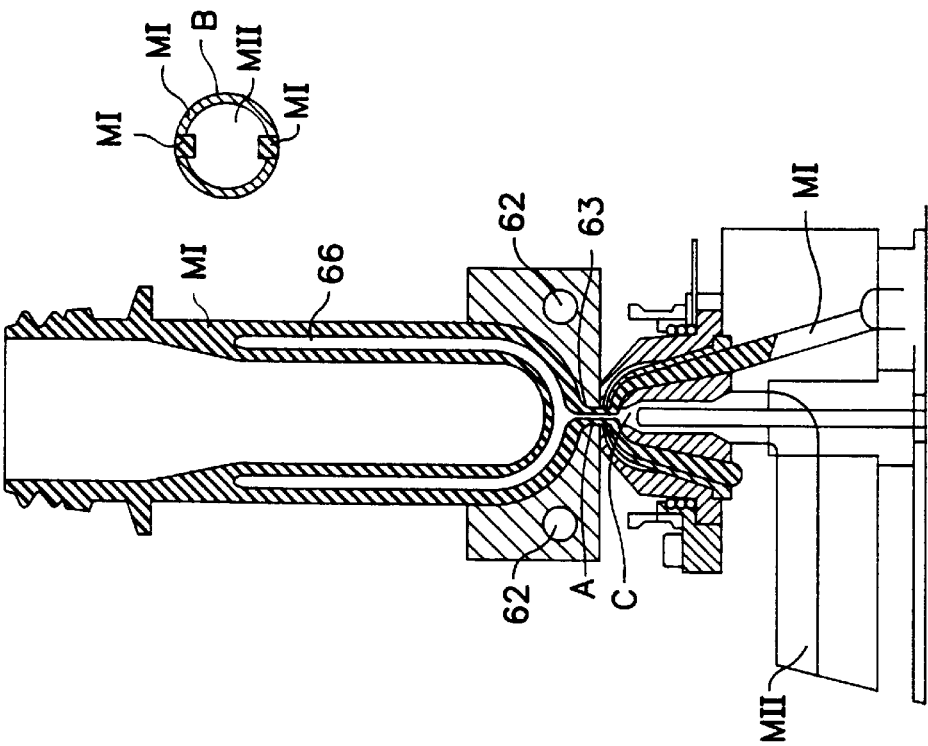
Figure 8:
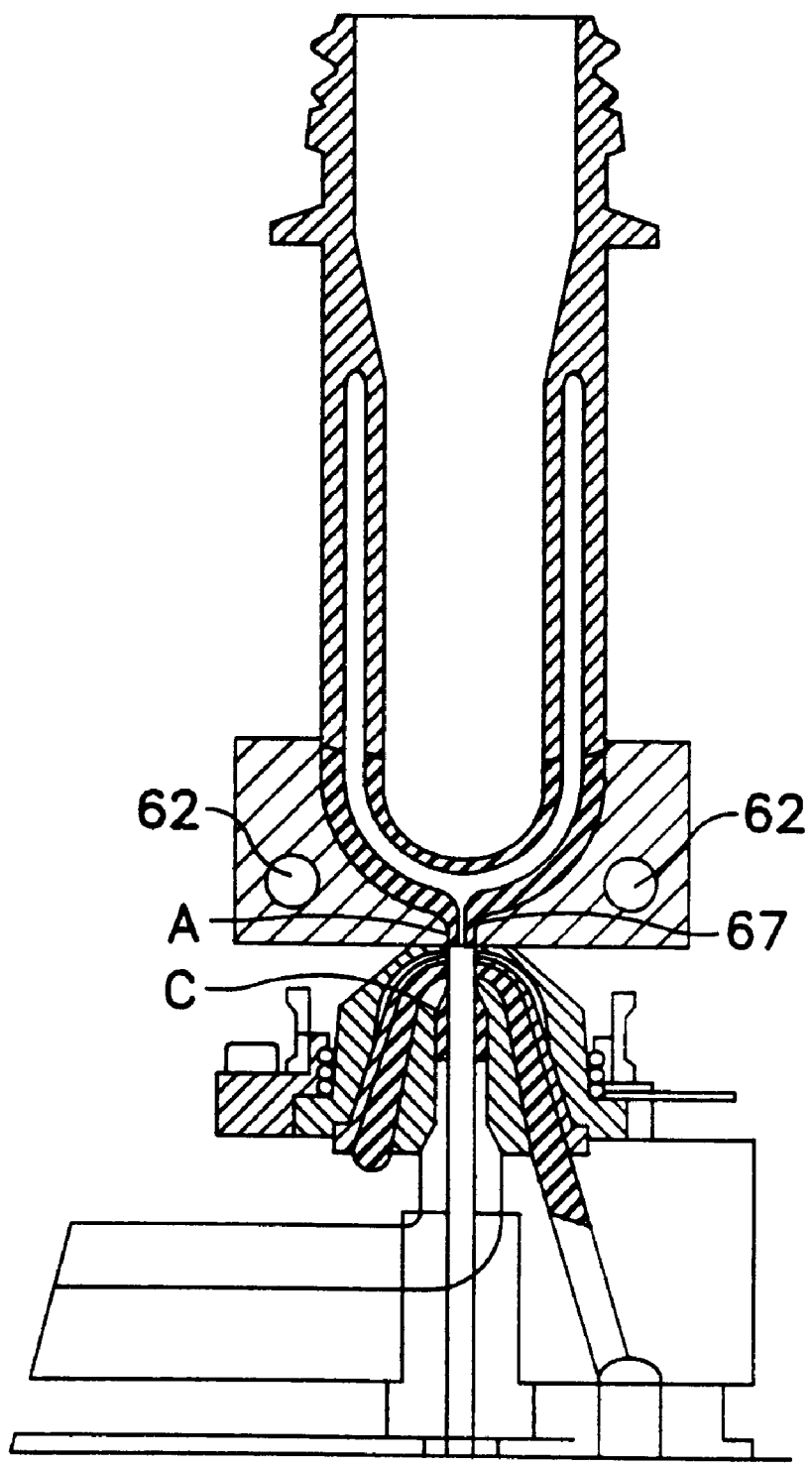

In the situation shown in FIG. 6, the mold cavity is filled. After a brief after-pressure period, the injection pressure is removed from the two types of material (point of time t2 in FIGS. 9 and 10). During a following cooling period, no material flows into the mold cavity anymore and the material in the injection channel 63 "freezes" (i.e. solidifies). FIG. 7 shows the situation after the cooling period. In the oblique bore(s) 36, a slight excess pressure relative to the central channel is created during a short time (t3–t4), through means suitable for that purpose. As a result, the second type of material is slightly forced back into the central bore 32. The central channel is as it were flushed out. No material can penetrate into the mold cavity anymore, because the sprue is "frozen". If the sprue is not or not entirely frozen, still no material will penetrate into the mold cavity anymore, as a consequence of the slight value of the excess pressure and also because the mold cavity is already completely filled. Hence, if so desired, the flushing out operation can already start at a moment when the sprue is not yet or not entirely "frozen". This also holds for the examples to be described hereinafter. If so desired, a slight reduced pressure can be generated in the central bore by means suitable for that purpose, through decompression, as is shown in FIG. 10. Now, between the head of the needle 40 and the central bore 35 which, viewed from the mold cavity, is located beyond the oblique bore(s), exclusively material of the first type is present. Located in the central bore itself are an outer layer of material of the first type and a core of material of the second type, with a small strip of material of the first type at the level of the oblique bore(s). Finally, the needle valve is moved again in the direction of the mold cavity, as indicated in FIG. 8. The remainder of the second type of material which is still located in the part of the central bore 35 that connects directly to the injection channel 63 is mechanically compressed in the sprue of the preform and also covered with a layer of material 67 of the first type MI. Accordingly, the entire preform, including the sprue, is thus provided with an uninterrupted homogeneous outer layer of material of the first type. Also, the sprue material is cleaned, i.e. it no longer contains any material of the second type.

Next, the mold is opened and the formed preform is removed, while the needle valve remains in the position of FIG. 8, which corresponds to that of FIG. 4. Because of the reduced pressure created in the phase of FIG. 7 and the press-on treatment carried out in the phase of FIG. 8, which also has a cleaning effect, exclusively material of the first type is present in the oblique bore(s) 37 and also in the section of the central bore 32 located adjacent the oblique bore(s), so that the injection-molding apparatus is ready for a next cycle. In the first phase of that cycle, exclusively the first type of material MI can flow into the mold cavity.

FIGS. 11–15 schematically illustrate an example of another method for manufacturing a hollow article, for instance a preform for a bottle, having a multilayered wall, by means of a controllable needle valve with different positions and an injection nozzle to which different types of plastic material can be fed via different channels. According to FIGS. 11–15, a needle valve is used which can be brought into three different positions A, B and C, for instance in the manner indicated in FIG. 2. The other parts of the apparatus shown also correspond to those of the apparatus shown in FIG. 2.

Figure 12:
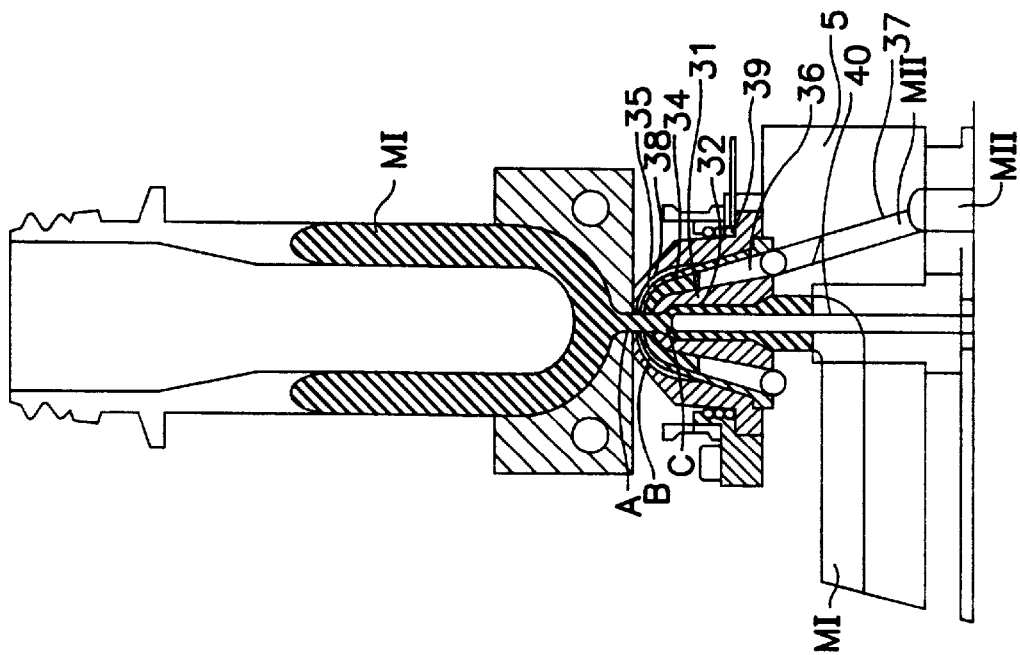
FIGS. 11–15 schematically illustrate another exemplary embodiment of a method according to the invention.
Figure 11:
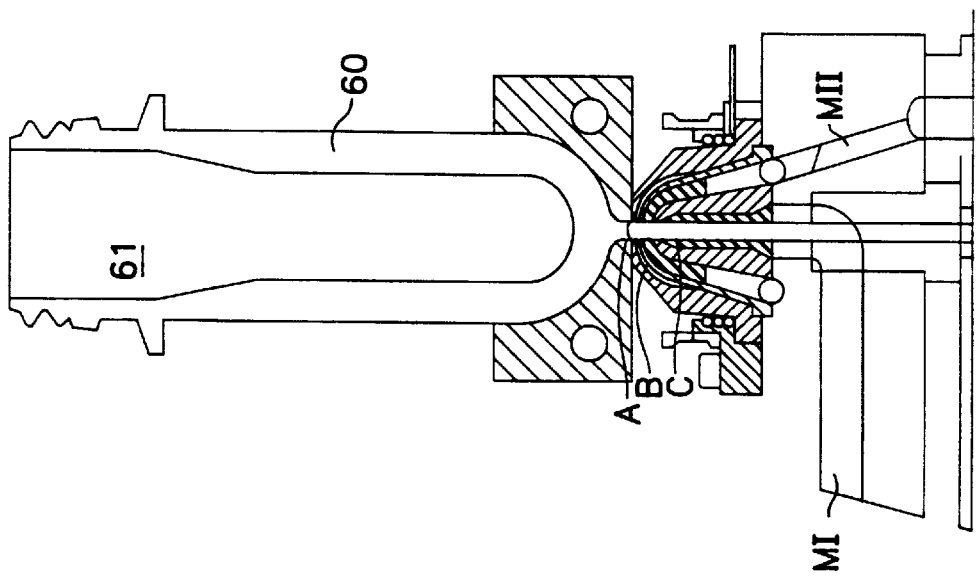
Figure 16:
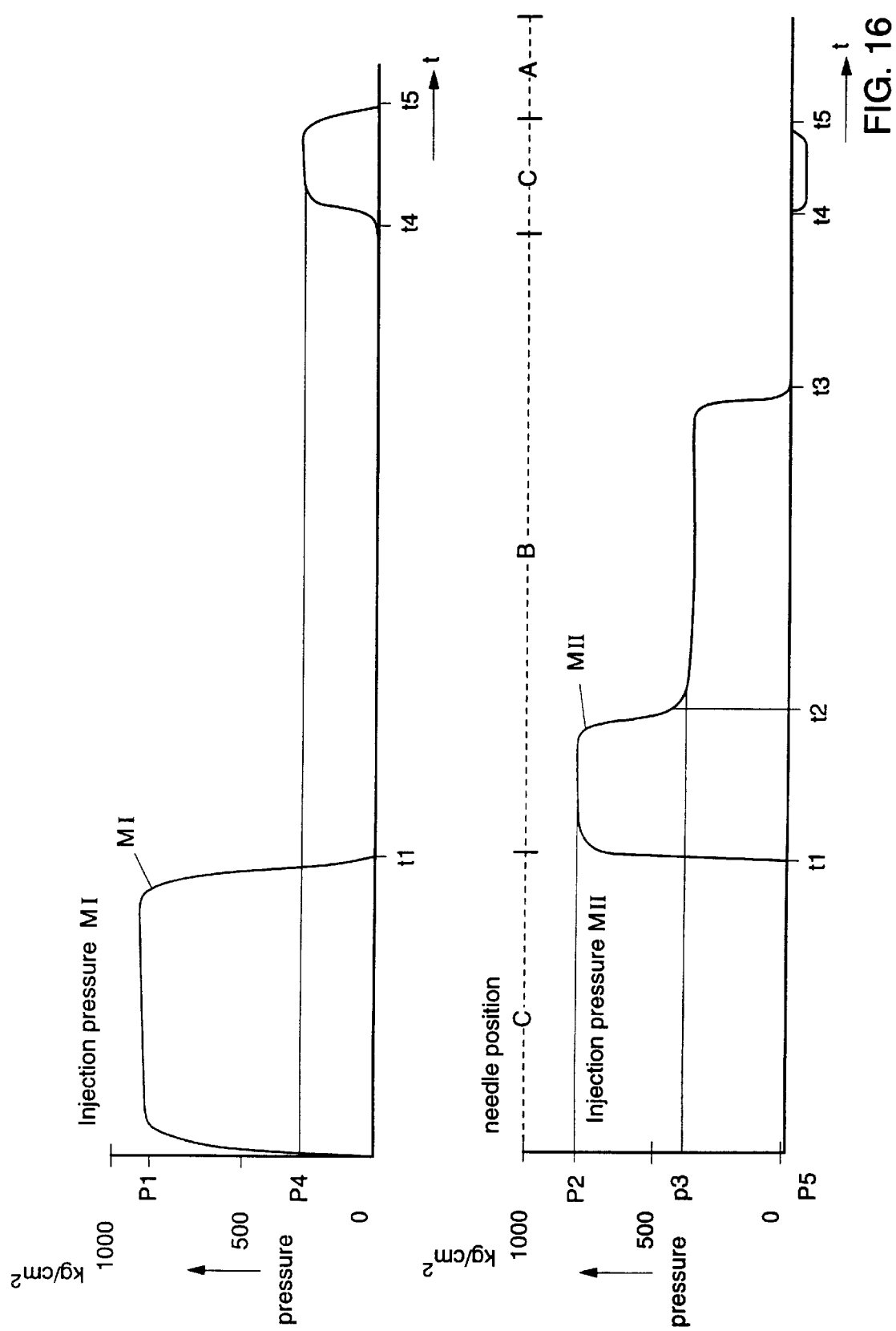
FIG. 16 schematically illustrates the curve of the injection pressure in the time in the method of FIGS. 11–15.

FIG. 11 shows the initial position. The needle 40 is in the forward position A and the mold cavity is empty. The mold may or may not be closed. The first type of material MI, which is to form the outer layer of the preform, is fed around the needle 40 via the central channel 32, with the mold closed. The second type of material MII is fed via one or more side channels formed by the central bore(s) 36. In the parts of the of the oblique bore(s) which connect to the central bore 35 of the injection nozzle and in the central channel 35, material of the type MI is present. After the mold is closed, the injection-molding cycle can start. For this purpose, the needle 40 is brought into the rearward position, position C, as shown in FIG. 12. Next, via the central channel 32, material of the type MI is injected into the mold cavity at the injection pressure P1 until the mold cavity is partly filled, for instance for ca. 70%. This situation is shown in FIG. 12. FIG. 16 shows the time curve of the injection pressure for material MI and, similarly, the injection pressure for material MII. From FIG. 16 it appears that up to the point of time ti after the start of the injection-molding cycle, material MI is injected at injection pressure A. FIG. 16 also indicates the needle position during the injection-molding cycle.

Figure 14:
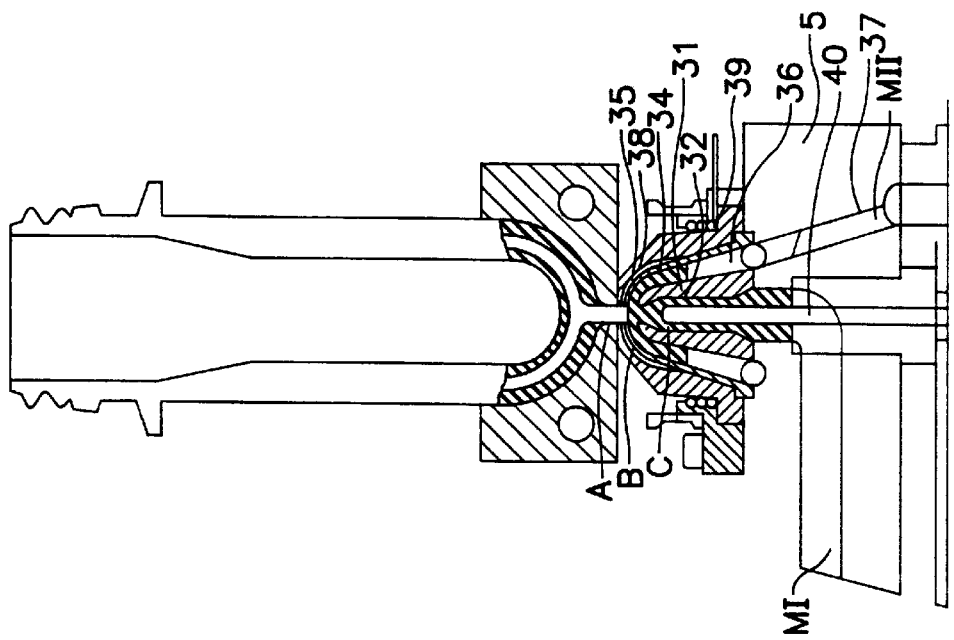
Figure 13:
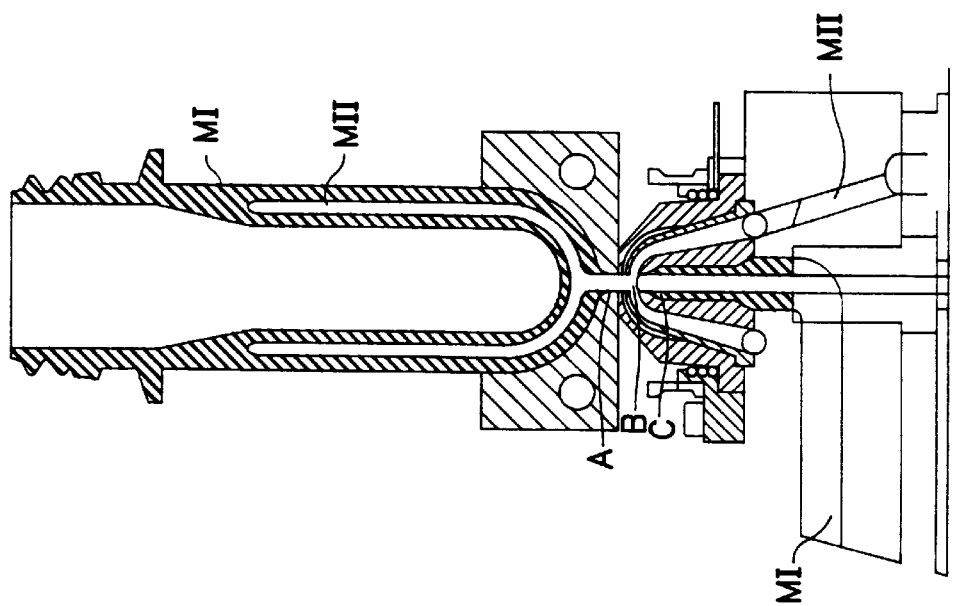
Figure 15:
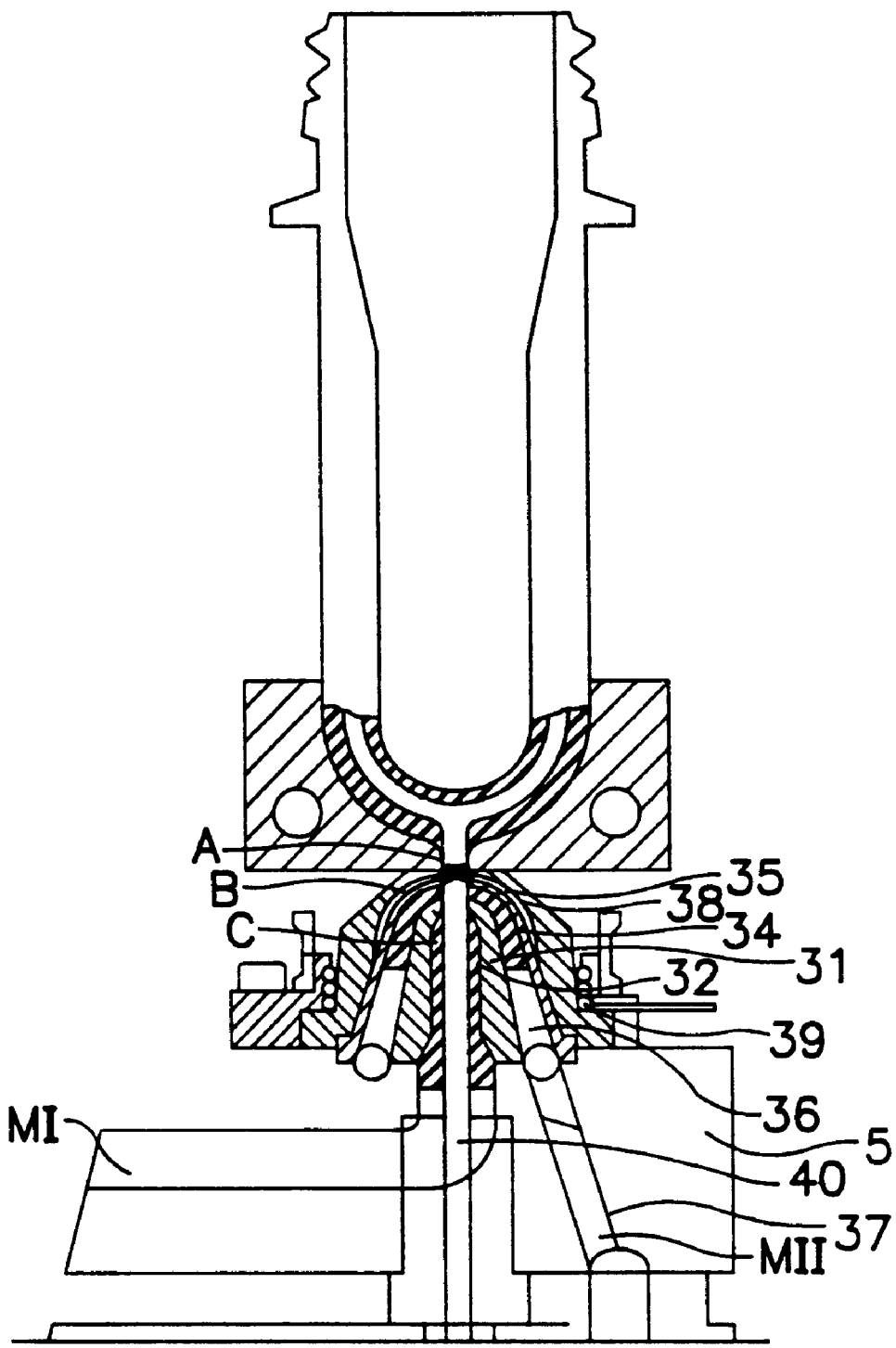

After sufficient material of the type MI has been injected into the mold cavity, the needle is brought into position B, as shown in FIG. 13. In that position, the needle closes the central bore 35, but the outlet of the oblique bore(s) in the bore 32a, in line with the central bore 32, remains clear. In this needle position, material of the second type MII is injected at injection pressure P2. In a known manner, the material MII forms a core layer within the material MI, as shown in FIG. 13. The injection of material MII approximately starts at point of time t1 and lasts until t2, after which the mold cavity is filled and the pressure of material MII is reduced to a lower value P3. This is the so-called after-pressure value, serving to keep the material in the mold cavity under pressure during cooling down. The after-pressure period ends at t3. After a brief cooling period, which ends at t4, the sprue of the preform in the injection channel 63 is at least partly frozen. Then, the needle is brought into the rearward position again (position C), as shown in FIG. 14, and a reduced pressure P5 is created in the oblique bore(s) 36, as shown in FIG. 16 for material MII in period t4–t5. During substantially the same period, a low excess pressure P4 is created in the central channel 35, so that the central channel 35 and the central bore 32a, as well as the parts of the oblique bore(s) that connect to the bore 32a, are filled with material of the first type MI. Finally, as is shown in FIG. 15, the needle is moved towards position A again, causing the needle to mechanically compress in the sprue the material of the first type MI and material of the second type MII which may or may not still be located before it. Despite the fact that the sprue is already "frozen", the mechanical press-on operation nevertheless provides a proper bond between the "frozen" material and the material pressed thereon by the needle. The result is again a preform having a wall consisting of three layers and an uninterrupted homogeneous outer wall of material MI.

Another variant of the invention is illustrated in FIGS. 17–22. In acccordance with the variant, use is made of a needle having a short narrower portion 70, located at a short distance behind the head 71 of the needle. The narrowed or reduced portion 70 of the needle is located at such a distance behind the head 71 and has such a length that the narrowed portion 70 leaves clear a connection between the oblique bore(s) 36 and the central channel 32 when the needle is in the forward position (position A).

For the rest, the apparatus shown in FIGS. 17–22 is similar or identical to the apparatus shown in FIGS. 2, 4–8 and 11–15.

Figure 18:
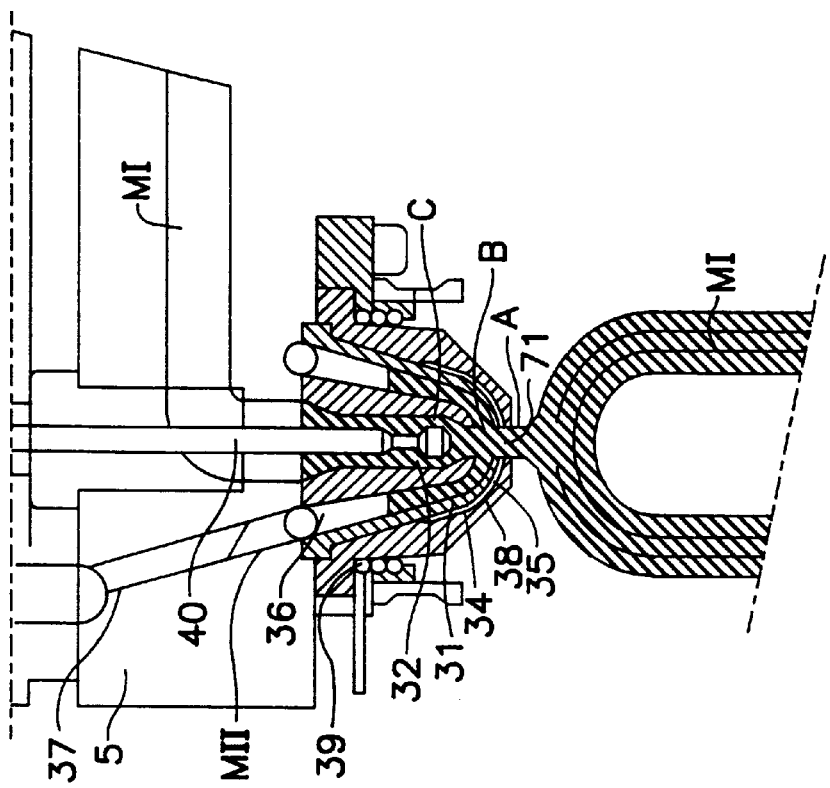
Figure 17:
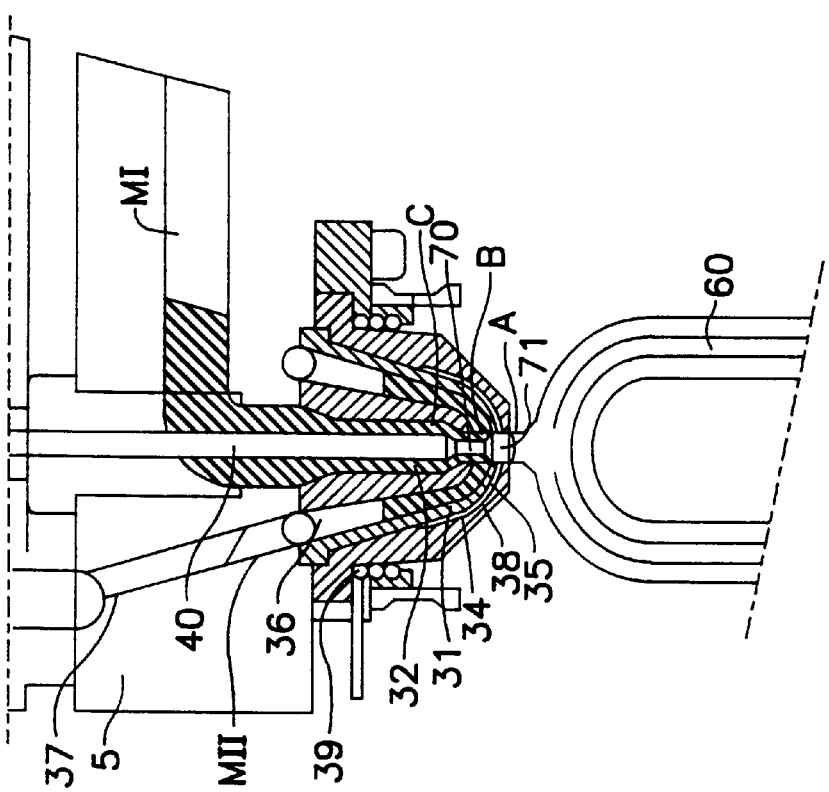

In the initial situation shown in FIG. 17, the mold cavity 60 is empty and the needle is in the forward position (position A). In the central channel 32, 32a and in the ends, connecting thereto, of the side channels 36, material of the first type MI is present. This material MI is fed via the central channel, while material of the second type MII, which will form the core layer of the preform, is fed via the side channel or the side channels 36. Then, the needle is brought into the rearward position (position C), as is shown in FIG. 18. In this needle position, material MI is fed, via the central channel 32, to the mold cavity 60, until this mold cavity is for instance filled for ca. 70%. Then, the needle is brought into position B, wherein, as shown in FIG. 19, the head of the needle closes the end 32a of the central channel 32. In that position of the needle, material MII is fed from the side channels into the mold cavity. The mold cavity is thus filled with material MI, wherein, in a manner known per se, a core layer of material MII is formed at least at the location of the bottom of the preform to the formed and a part connecting to the bottom.

Figure 22:
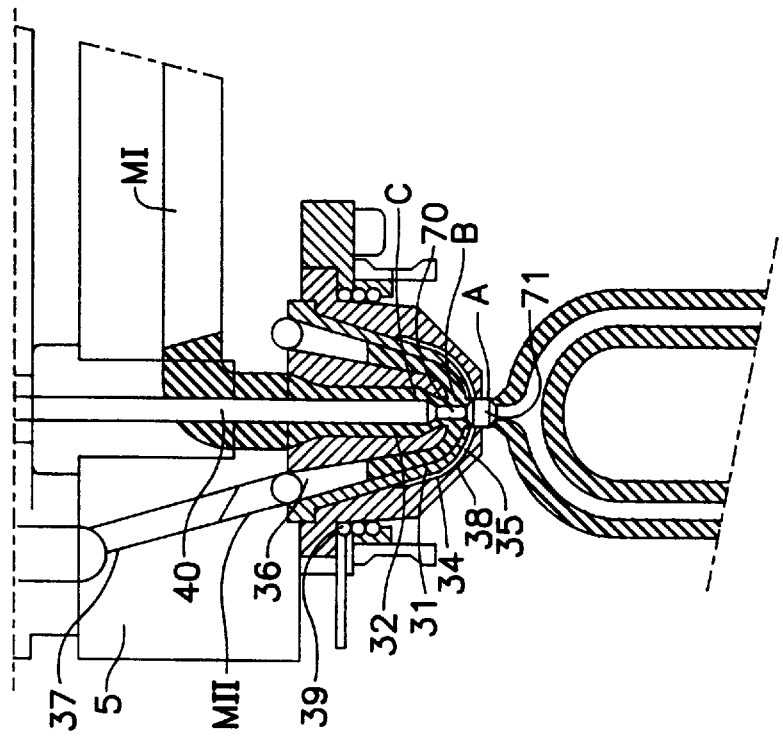
Figure 21:
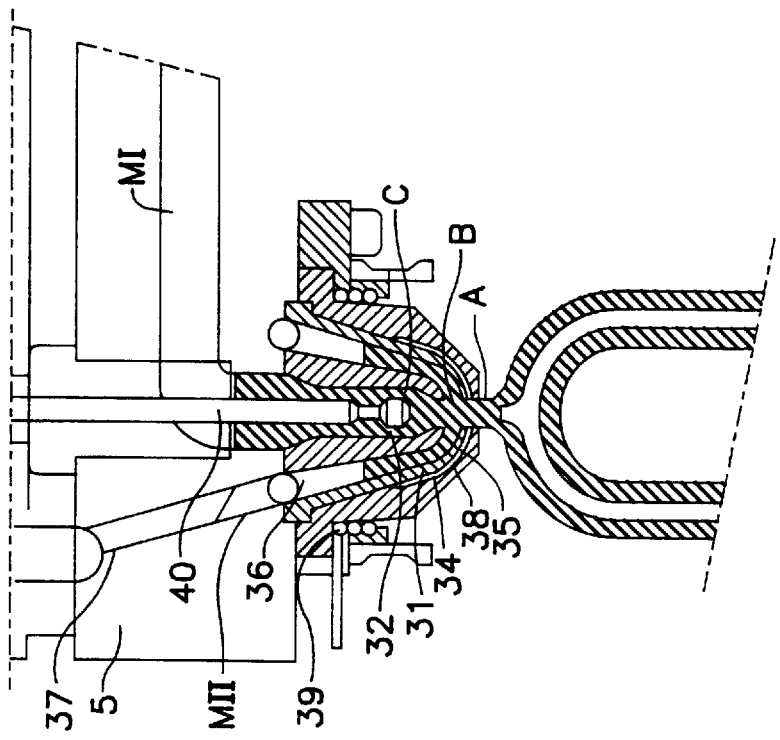
Figure 24:
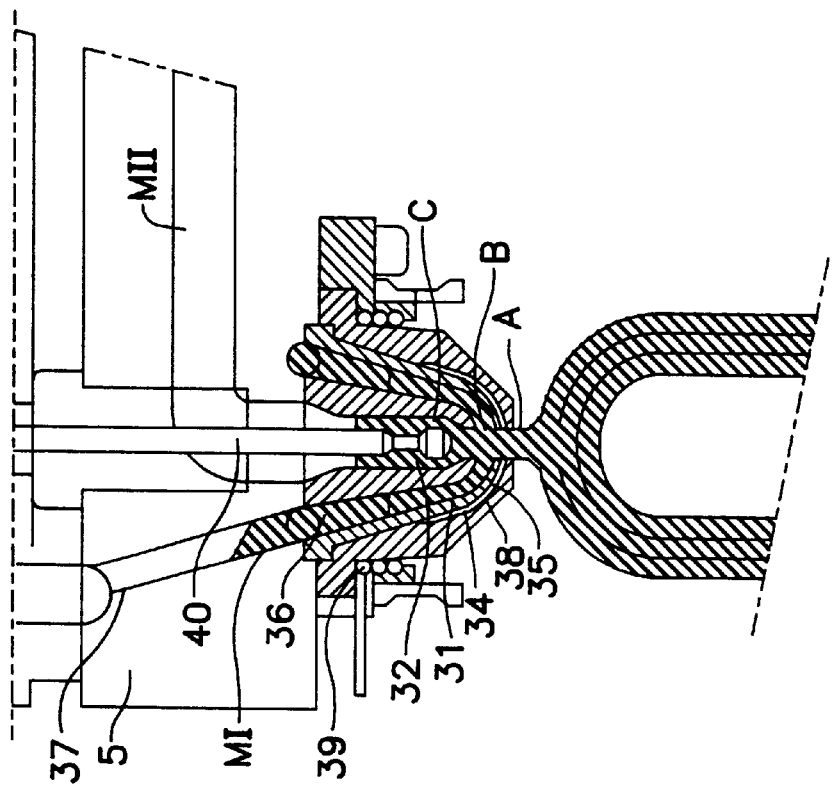

When the mold cavity is completely filled, the needle is brought into the forward position again. Material of the type MII which is still present in the front part 35 of the central bore is pressed into the mold cavity and the pressure on the material in the mold cavity is maintained. In this manner, material MII is removed from the bore 35. Also, in this position of the needle, a reduced pressure is created in the side channels (decompression) and/or an excess pressure is created in the central channel, so that via the reduced portion 70, material MI is displaced from the central channel into the side channels. This situation is shown in FIG. 20. After that, the needle is withdrawn into position C, causing the entire front part of the central channel to be filled with material of the first type MI (FIG. 21). Finally, after the sprue of the preform has been "frozen" completely or partly, the needle is moved forwards again, as shown in FIG. 22, and a covering of material MI is again mechanically pressed onto the material MII in the sprue.

Further, for completeness' sake, FIGS. 23–28 schematically illustrate a method for obtaining a preform having a completely closed outer surface by means of a needle having a narrowed portion, as used in the method illustrated in FIGS. 17–22, and utilizing only two positions (positions A and C).

Figure 23:
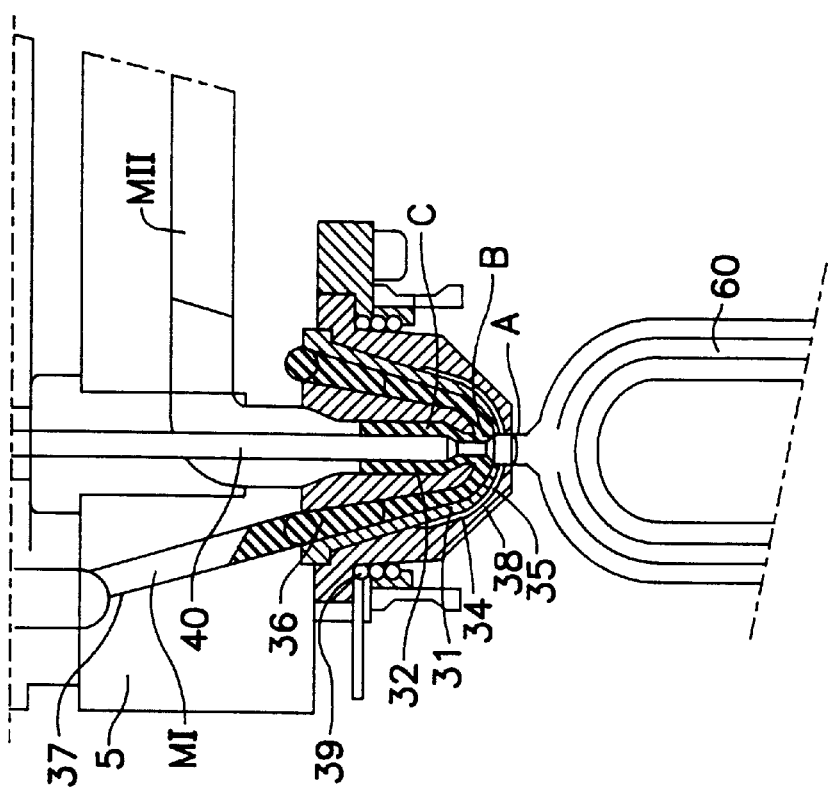
Figure 26:
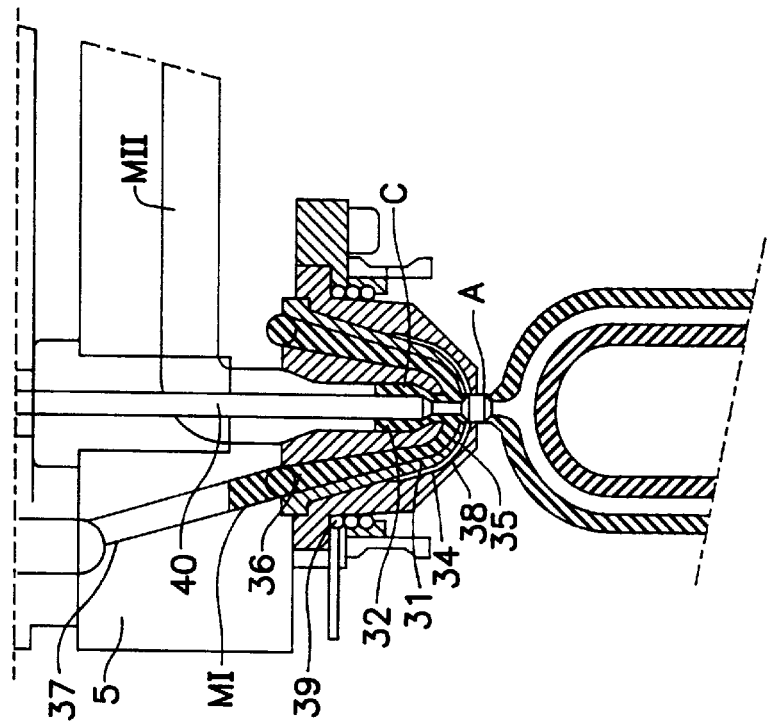
Figure 25:
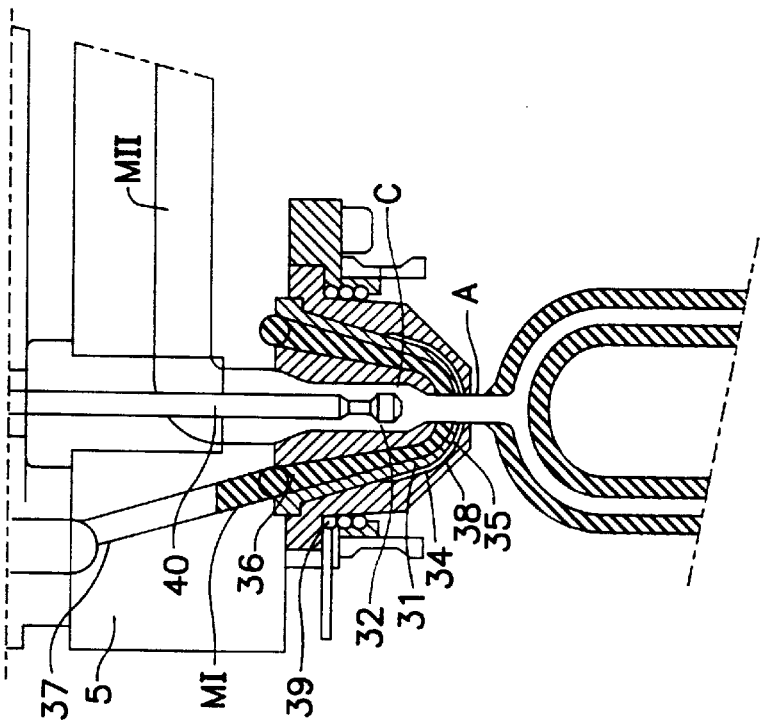

FIG. 23 shows the initial position. The various parts of the apparatus shown correspond to those of the other Figures. The mold cavity is empty. The needle is in the forward position (position A). Material MI for the outer layer of the preform to be formed is fed via the side channels 36. Material MII for the core layer is fed via the central channel. The material MI is located in the side channels and also adjacent the end of the central channel 32 around the needle. Via the reduced portion of the needle, the side channels communicate with the central channel 35. In the following phase, the needle is withdrawn into position C (FIG. 24) and material MI is injected into the mold cavity from the side channels, until the cavity is filled to a predetermined degree, for instance 70%. In the next phase (FIG. 25), the injection pressure of the material MI is reduced and the central channel is pressurized. The mold cavity is then filled further with material MII and a slight percentage of material MI. In this phase, for instance 28% MII and 2% MI can be fed. When two side channels are used, as shown in FIGS. 23–28, the material MI in this phase forms two small strips along the material MII, in a similar manner as shown in FIG. 6. Then, the needle is brought into the forward position again (FIG. 26). This involves cleaning and closing of the central channel beyond the side channels. Also, a reduced pressure is created in the central channel (decompression) and/or an excess pressure is created in the side channels, causing material MI to flow, via the reduced portion of the needle, from the side channels into the central channel and to force back the material MII somewhat. After a predetermined press-on time, the needle is withdrawn again (FIG. 27). The front portion 35 of the central channel is thereby released and is filled with material MI. After that, the needle is brought into the forward position again (FIG. 28), as a result of which the material MII in the sprue of the preform, which material is meanwhile completely or partly "frozen", is covered with a covering of material MI, pressed-on mechanically.

Figure 29:
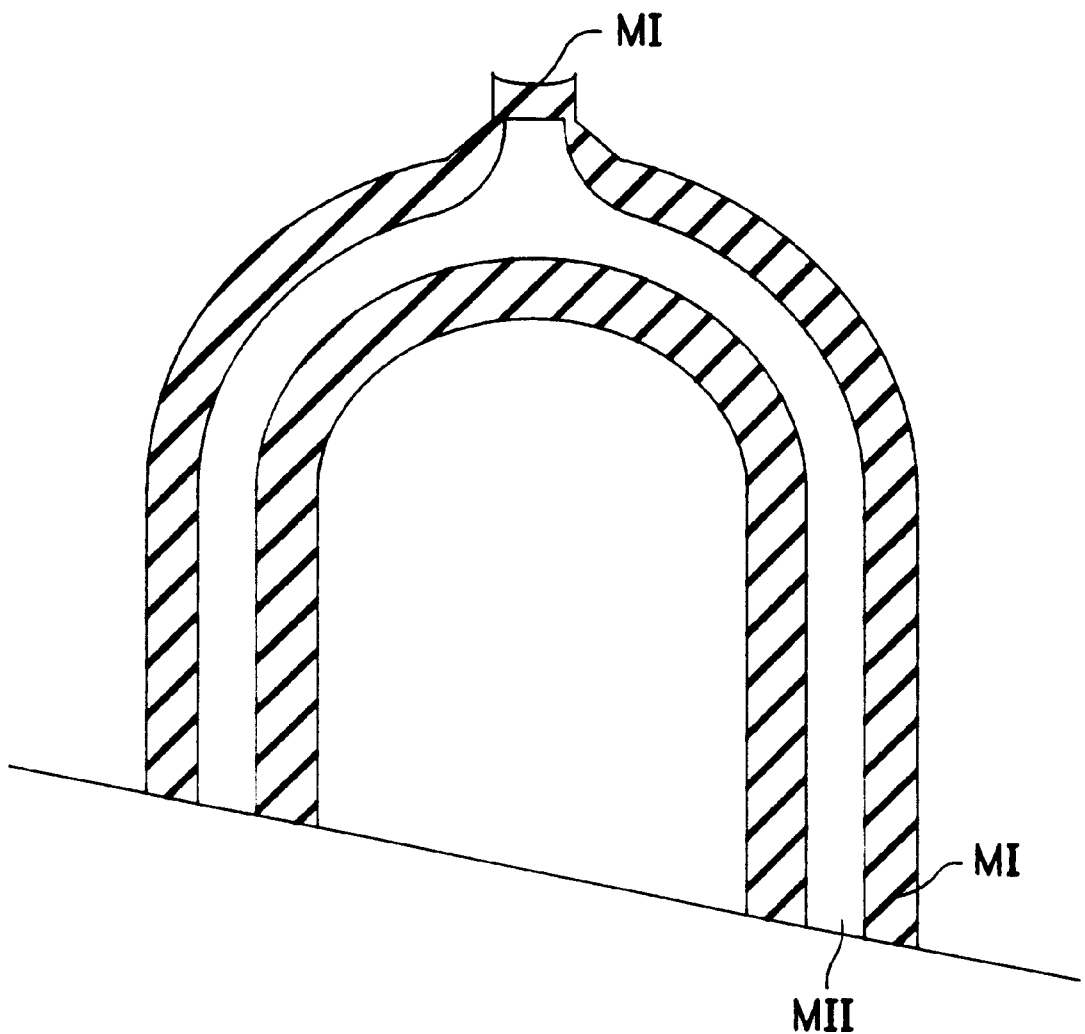
FIG. 29 shows, in section, a part of a preform according to the invention.

For completeness' sake, FIG. 29 shows an enlarged view of the bottom portion with the sprue of a preform for a bottle, manufactured according to the invention. It is clearly visible that everywhere, and in particular also at the location of the sprue, the core material MII is completely surrounded by surface material MI. As a result, the chances of the surface material coming loose from the core material are reduced considerably, or even to zero. Special bonding layers, as have been used in the past, can then be omitted.

It is observed that after the foregoing, various modifications will readily occur to a skilled person. For instance, the mechanical compression of a slight amount of material of the first type, i.e. of the material of the outer layer of the preform, can also be applied if the preform wall has more than three layers. Likewise, through the use of decompression in the feed channels of material of the second, third, fourth etc. type, in combination with the feed of material of the first type to the central channel, it can be provided that at the desired point of time, i.e. precisely after and/or during the "freezing" of the sprue, material of the first type is located before the needle.

Further, in the foregoing, in each case one or more side channels are started from, which side channels open into the central channel but are not concentric therewith. However, the mechanical pressing on of the sprue can also take place with the use of a central channel and a conical further channel concentrically formed therewith and connecting thereto.

These and other modifications are understood to fall within the framework of the invention.

We claim:

1. A method for manufacturing hollow plastic articles having a wall which at least partly consists of at least one core layer and two outer layers covering the core layer on both sides, wherein use is made of an injection-molding machine with a mold comprising at least one mold cavity, and an injection nozzle which, via an injection channel in the mold, connects to the mold cavity and has a central material feed channel a needle of a controllable needle valve being active in the central material feed channel and being closeable or releasing part of the central material feed channel located adjacent the injection channel, and at least one further material feed channel, opening into the central material feed channel, wherein first a first plastic material for forming the outer layers is fed to the mold cavity and then at least one second plastic material for forming the at least one core layer is fed to the mold cavity, and after the feeding of the at least one second plastic material to the mold cavity, the first plastic material is fed to the central channel in at least a space before a free end of the needle, and that after the material in the injection channel is at least partly solidified, the needle is moved to the injection channel for mechanically compressing, in a sprue of the plastic article located in the injection channel, the material located before the free end of the needle.

2. A method according to claim 1, wherein the central material feed channel of the injection nozzle is of a larger diameter than the needle and a central bore which is in line with the central channel and connects to the injection channel, the central bore having substantially a same diameter as the needle for receiving the needle in a closing manner, and having at least one side channel laterally opening into the central bore.

3. A method according to claim 2, wherein prior to the sprue being mechanically compressed, the first plastic material is fed to the central channel through displacement of the at least one second plastic material by a pressure difference between the channel for the first plastic material and the channel for the at least one second plastic material.

4. A method according to claim 3, wherein during displacement of the at least one second plastic material, a reduced pressure is exerted on said at least one second plastic material.

5. A method according to claim 4, wherein the first plastic material is fed via the at least one further material feed channel, and the at least one second plastic material is fed via the central channel.

6. A method according to claim 5, wherein two positions of the needle are used, and in a first or rearward position, the needle leaves clear the central material feed channel and the at least one further material feed channel, whilst in a second or forward position, the needle closes all material feed channels and extends to the injection channel.

7. A method according to claim 6, wherein at the start of an injection-molding cycle, the needle is in the forward position and is then withdrawn into the rearward position, and thereafter, the first plastic material is injected, via the at least one further channel, into the mold cavity until said mold cavity is partly filled, and the injection pressure of the first plastic material is then reduced and an injection pressure is exerted on the at least one second plastic material, so that the mold cavity is further filled to form the core layer consisting of the at least one second plastic material and a slight amount of the first plastic material, and then, after a predetermined cooling period, at least one of a reduced pressure in the central channel and an excess pressure in the at least one further channel is created, and that, finally, the needle is pressed into the forward position for compressing the material located before the needle in the sprue.

8. A method according to claim 7, wherein, at a short distance behind the head of the needle, the needle is provided with a narrowed portion, wherein the narrowed portion in the forward position of the needle forms a connection between the central channel and the at least one further channel, and after the material for the core layer has been injected, the needle is brought into the forward position for cleaning a front part of the central channel, and, next, the at least one second plastic material is displaced by the first plastic material in a part of the central channel that connects to the front part, and, thereafter, the needle is brought into the rearward position and, after the sprue is at least partly solidified, is brought into the forward position again.

9. A method according to claim 1, wherein the first plastic material is fed via the central channel and the at least one second plastic material is fed via the at least one further channel.

10. A method according to claim 9, wherein three positions of the needle are used, wherein in a first or rearward position, the needle leaves clear the central channel and the at least one further channel, wherein in a second or forward position the needle closes all material feed channels and extends to the injection channel; and wherein, in a third or intermediate position, the material feed from the central channel is blocked and the at least one further channel is free.

11. A method according to claim 10, wherein at the start of an injection-molding cycle, the needle is in the forward position, is then withdrawn into the rearward position, and thereafter, via the central channel, the first plastic material is injected into the mold cavity until said mold cavity is partly filled; and the needle is then brought into the intermediate position and, via the at least one further channel, the at least one second plastic material is injected into the mold cavity until said mold cavity is filled for forming the core layer; and the needle is then brought into the rearward position and a reduced pressure is created in the at least one further channel, so that the at least one second plastic material is displaced from the central channel and the parts of the at least one further channel that connect thereto by the first plastic material; and that, finally, after the sprue is at least partly solidified the needle is brought into the forward position for mechanically compressing the material located before the needle in the sprue.

12. A method according to claim 11, wherein, at a short distance behind the head of the needle, the needle is provided with a narrowed portion, wherein the narrowed portion, in the froward position of the needle, forms a connection between the central channel and the at least one further channel; and after the injection of the at least one second plastic material, the needle is brought into the forward position for cleaning front part of the central channel, and then, via the narrowed portion of the needle, the at least one second plastic material is displaced by the first plastic material in a part of the at least one further channel that connects to the central channel, and thereafter, the needle is brought into the rearward position and then, after the sprue is at least partly solidified, into the forward position for mechanically compressing the material located before the needle in the sprue.

* * * * *